United States Patent
Shimada et al.

(10) Patent No.: US 8,699,310 B2
(45) Date of Patent: Apr. 15, 2014

(54) OPTICAL INFORMATION RECORDING MEDIUM, OPTICAL INFORMATION RECORDING/REPRODUCING DEVICE AND OPTICAL INFORMATION RECORDING/REPRODUCING METHOD

(75) Inventors: Kenichi Shimada, Yokohama (JP); Tatsuro Ide, Kawasaki (JP); Takeshi Shimano, Moriya (JP); Harukazu Miyamoto, Higashimurayama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 699 days.

(21) Appl. No.: 12/680,612

(22) PCT Filed: Aug. 6, 2008

(86) PCT No.: PCT/JP2008/064096
§ 371 (c)(1),
(2), (4) Date: Jul. 12, 2010

(87) PCT Pub. No.: WO2009/050934
PCT Pub. Date: Apr. 23, 2009

(65) Prior Publication Data
US 2010/0271921 A1    Oct. 28, 2010

(30) Foreign Application Priority Data
Oct. 19, 2007   (JP) ................. 2007-273078

(51) Int. Cl.
*G11B 7/0065* (2006.01)
(52) U.S. Cl.
USPC ................. 369/103; 369/112.1; 369/112.15
(58) Field of Classification Search
CPC .............. G11B 7/0065; G11B 7/083
USPC ................. 369/103, 112.1, 112.15
See application file for complete search history.

(56) References Cited

U.S. PATENT DOCUMENTS

| | | | |
|---|---|---|---|
| 5,946,286 A * | 8/1999 | Bahns | 369/275.3 |
| 2003/0156523 A1 * | 8/2003 | Wu et al. | 369/103 |

(Continued)

FOREIGN PATENT DOCUMENTS

| | | |
|---|---|---|
| JP | 2002-170247 | 6/2002 |
| JP | 2004-272268 | 9/2004 |

(Continued)

OTHER PUBLICATIONS

Toshio Ando et al, "Holographic Data Storage Media Employing Phase-Change Reflector"; Japanese Journal of Applied Physics, Japan Society of Applied Physics, JP, vol. 46 No. 6B, Jan. 1, 2007, pp. 3855-3857.

(Continued)

*Primary Examiner* — Joseph Feild
*Assistant Examiner* — Carl Adams
(74) *Attorney, Agent, or Firm* — Antonelli, Terry, Stout & Kraus, LLP.

(57) ABSTRACT

A holographic recording medium in which information can be reproduced by phase conjugate beam without requiring a mirror for obtaining the phase conjugate beam and its driving part and recording density is not reduced. The recording medium includes a recording layer in which an interference pattern is recorded and a light absorption/transmission layer which can be reversibly changed to be in a first state where signal beam and reference beam passed through the recording layer are absorbed at the time of recording of information and a second state where the reference beam is transmitted at the time of reproduction of information, and the reference beam transmitted through the light absorption/transmission layer is reflected by a reflection layer to produce the phase conjugate beam.

23 Claims, 9 Drawing Sheets

(56) References Cited

U.S. PATENT DOCUMENTS

| | | |
|---|---|---|
| 2004/0165518 A1 | 8/2004 | Horimai |
| 2006/0066948 A1* | 3/2006 | Mizuyama .................. 359/569 |
| 2007/0047420 A1* | 3/2007 | Yanagihara ................. 369/103 |
| 2007/0171772 A1* | 7/2007 | Oshima et al. ............... 369/14 |
| 2007/0243472 A1* | 10/2007 | Ando et al. ...................... 430/1 |
| 2008/0007808 A1 | 1/2008 | Ogasawara et al. |
| 2008/0192311 A1 | 8/2008 | Horimai |

FOREIGN PATENT DOCUMENTS

| | | |
|---|---|---|
| JP | 2007-101704 | 4/2007 |
| JP | 2008-116896 | 5/2008 |
| WO | WO 2004/102542 A1 | 11/2004 |
| WO | WO 2006/064660 A1 | 6/2006 |
| WO | WO 2006/090624 A1 | 8/2006 |

OTHER PUBLICATIONS

Akemi Hirotsune et al, "Layer-Selection-Type Recordable Optical Disk With Inorganic Electrochromic Film" Japanese Journal of Applied Physics, Japan Society of Applied Physics, JP, vol. 45, No. 2B, Jan. 1, 2006; pp. 1235-1238.

Ian Redmond; The InPhase Professional Archive Drive OMA: Design and Function; Technical Digest ODS, 2006, MA1.; InPhase Technologies, Inc., 2000 Pike Road, Longmont, Colorado 80501; ianredmond@imphase-tech.com.

* cited by examiner

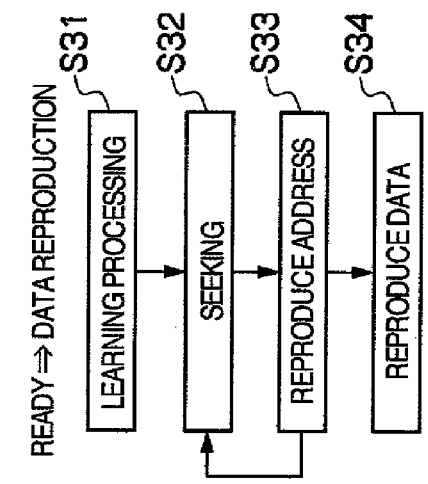
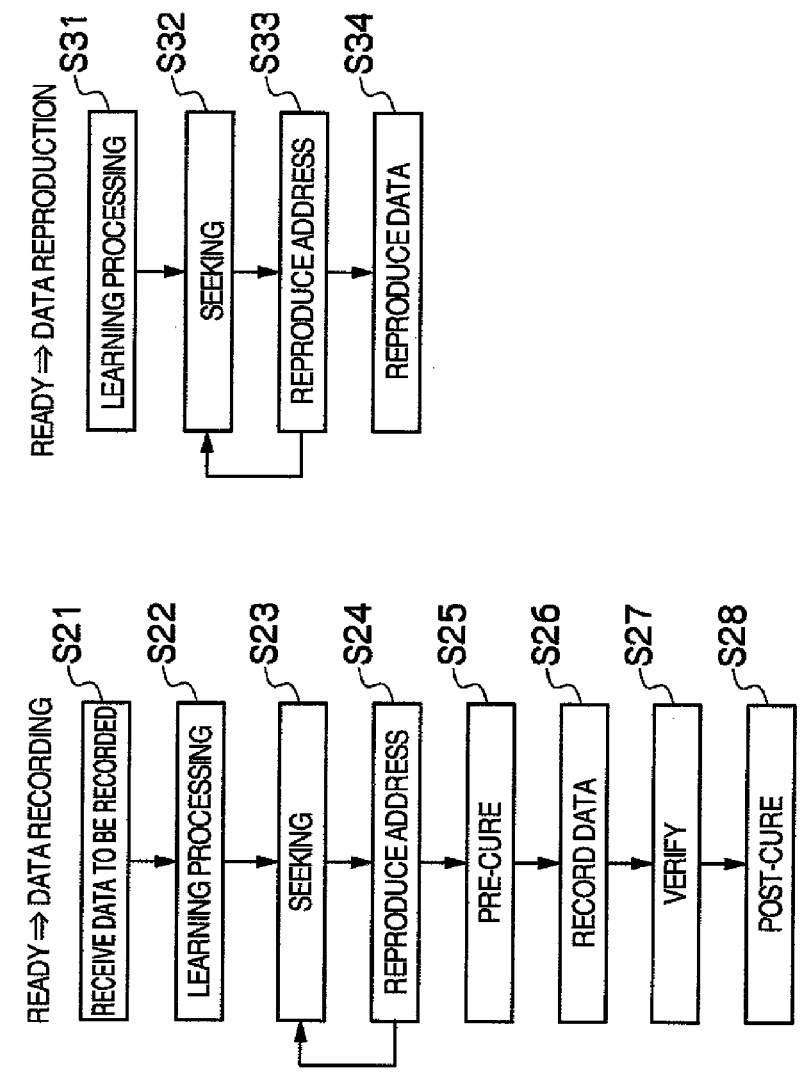
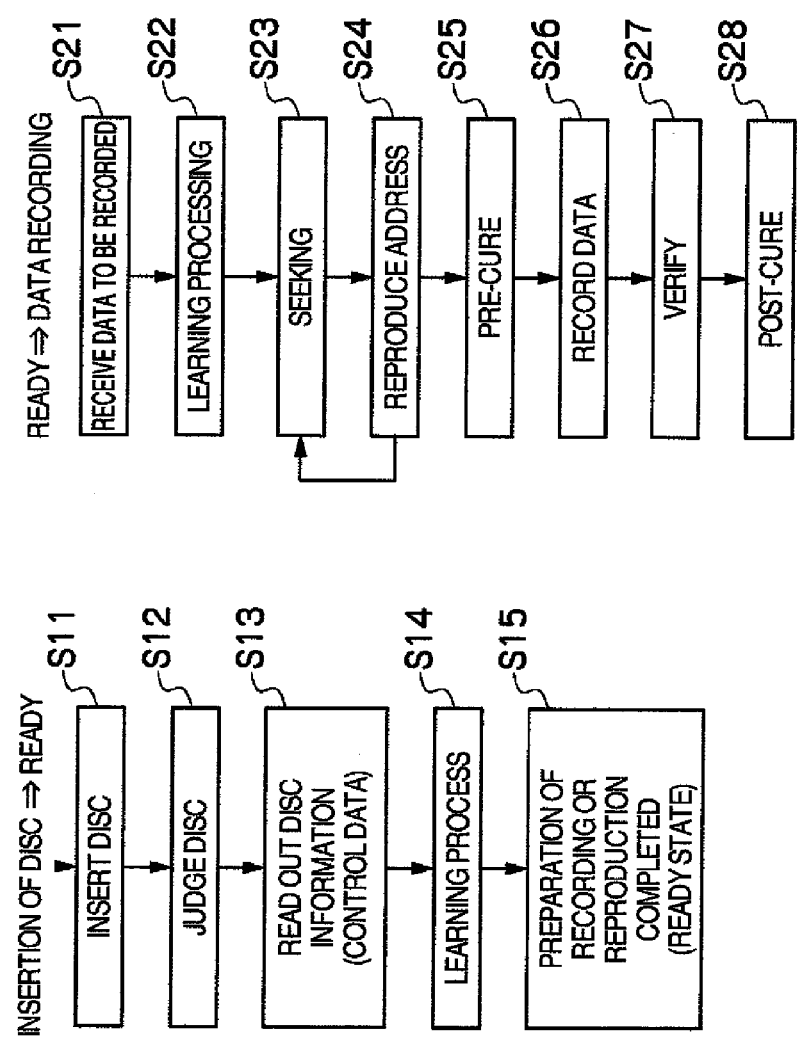

UPON RECORDING

UPON REPRODUCTION

UPON RECORDING

UPON REPRODUCTION

UPON RECORDING

UPON REPRODUCTION

UPON RECORDING

UPON REPRODUCTION

UPON RECORDING

UPON REPRODUCTION

OPTICAL INFORMATION RECORDING MEDIUM, OPTICAL INFORMATION RECORDING/REPRODUCING DEVICE AND OPTICAL INFORMATION RECORDING/REPRODUCING METHOD

INCORPORATION BY REFERENCE

This application claims priority from Japanese Patent Application No. 2007-273078 filed on Oct. 19, 2007, the entire disclosure of which is hereby incorporated by reference into this application.

TECHNICAL FIELD

The present invention relates to an optical information recording medium for recording therein information using holography, an optical information recording/reproducing device using the medium and a method of recording/reproducing optical information using the medium.

BACKGROUND ART

Optical discs having the recording density of about 50 GB can be currently produced on a commercial basis even for general use in accordance with standards for Blu-ray Disc (BD) and High-Definition Digital Versatile Disc (HD DVD) using blue-violet semiconductor laser. In future, the optical discs are also desired to have as large a capacity as 100 GB to 1 TB of the Hard Disc Drive (MD).

However, in order to realize such super-high density optical discs, the high-density technique using a new system different from the conventional technique like BD using short wavelength and high numerical aperture (NA) of objective lens is required.

Attention has been paid to holographic recording technique using holography to record digital information while the storage technique for the next generation is being studied. The holographic recording technique is the technique of superimposing signal beam having page data information modulated two-dimensionally by a spatial light modulator and reference beam in a recording medium to modulate the refractive index in the recording medium by an interference pattern produced at the time of the superimposition, so that information is recorded in the recording medium (storage medium).

In reproduction of information, when the recording medium is irradiated with the reference beam used in recording, the holograms recorded in the recording medium act like a diffraction grating to produce diffracted beam. The diffracted beam is reproduced as the same light as the recorded signal beam containing phase information.

The reproduced signal beam is detected two-dimensionally at high speed by means of an optical detector such as CMOS and CCD. Such holographic recording technique can record two-dimensional information (page data) in the optical recording medium by a single hologram all at once and reproduce the information. A plurality of page data can be written in a certain place of the recording medium in a multiplexing manner and accordingly a large capacity of information can be recorded/reproduced at high speed.

A holographic recording technique is described in JP-A-2004-272268 (patent document 1), for example. This publication describes a so-called angularly multiplexed holograms recording system in which signal beam is focused on an optical information recording medium by a lens while the recording medium is irradiated with reference beam of paralleled light beam to interfere with each other so that holograms are recorded and further different page data are displayed in a spatial light modulator while an incident angle of the reference beam on the optical recording medium is different, so that angularly multiplexed recording is performed.

This publication describes the technique in which signal beam is focused by a lens and an aperture (spatial filter) is disposed in a beam waist thereof, so that the space between adjacent holograms can be shortened so that the recording density and capacity can be increased as compared with the conventional angle-multiplexed recording system.

Further, another holographic recording technique is disclosed in WO 2004-102542 (patent document 2), for example. This publication describes an example using a shift multiplexing system in which light from pixels on inner side is used as signal beam and light from pixels in ring-shaped zone on outer side is used as reference beam in a single spatial light modulator and both light beams are focused on an optical recording medium by the same lens so that the signal beam and the reference beam interfere with each other in the vicinity of the focal plane of the lens to record holograms.

Ian Redmond: Technical Digest ODS (2006), MA1. (non-patent document 1) discloses that when information recorded in an optical information recording medium is reproduced, phase conjugate beam of reference beam is used, so that optical components of signal detecting camera for recording system can be used as reproduction system.

Moreover, JP-A-2002-170247 (patent document 3) describes a holographic recording/reproducing method in which a holographic recording medium has a reflecting layer and phase conjugate beam obtained by reflecting reference beam by the reflecting layer is used to reproduce information recorded in the holographic recording medium.

According to the recording medium utilized in this recording/reproducing method, since the holographic recording medium (holographic storage medium) has the reflection layer, a galvano-mirror for obtaining the phase conjugate beam and a driving part for driving the galvano-mirror can be omitted to avoid height and size of the holographic recording/reproducing device from being increased.

DISCLOSURE OF INVENTION

According to the recording/reproducing method utilizing the holographic recording medium described in the patent document 3, since the reference beam is reflected by the reflecting layer at the time of recording, there is a drawback that an irradiated area of the recording medium is widened and a recording area becomes large. Furthermore, there is a drawback that signal beam is also reflected by the reflecting layer and accordingly hologram is newly formed in the recording medium by the reflected signal beam. The holographic recording medium described in the patent document 3 can prevent the holographic recording/reproducing device from being made large but on the other hand the recording density of the recording medium is reduced due to the above drawbacks.

Accordingly, it is an object of the present invention to provide a holographic recording medium in which information can be reproduced by phase conjugate beam and recording density is not reduced without requiring mirror for obtaining phase conjugate beam described in the non-patent document 1 and driving part thereof.

Moreover, it is another object of the present invention to provide a recording/reproducing device of an optical information recording medium in which a holographic recording medium having a reflection layer which reflects reference beam to form phase conjugate beam is utilized to omit mirror for obtaining phase conjugate beam and a driving part thereof so that information can be recorded in the holographic recording medium with high density.

It is still another object of the present invention to provide a recording/reproducing device of an optical information recording medium in which a holographic recording medium having a reflection layer which reflects reference beam to form phase conjugate beam can be utilized to record information in the holographic recording medium at high density without utilizing mirror for obtaining phase conjugate beam and a driving part thereof.

The above objects is achieved by the optical information recording medium which records and reproduces information using holography in which interference pattern produced when signal beam and reference beam are superimposed is recorded as change of refractive index at the time of recording of information and phase conjugate beam of the irradiated reference beam is diffracted by the interference pattern to produce recovered beam so that the recovered beam is supplied to a signal processing system at the time of reproduction of the recorded information, the optical information recording medium including a reflection layer which does not reflect the signal beam and the reference beam at the time of recording of the information and reflects the reference beam to produced the phase conjugate beam at the time of reproduction of the information.

According to the present invention, there can be provided a holographic recording medium which can reproduce information by phase conjugate beam without requiring a mirror for obtaining the phase conjugate beam and its driving part and in which recording density is not reduced.

Furthermore, according to the present invention, there can be provided a reproducing/recording device of an optical information recording medium in which a holographic recording medium including a reflection layer which reflects reference beam to form phase conjugate beam is utilized to omit a mirror for obtaining the phase conjugate beam and its driving part and information can be recorded in the holographic recording medium at high density.

Moreover, according to the present invention, there can be provided a reproducing/recording method of an optical information recording medium in which a holographic recording medium including a reflection layer which reflects reference beam to form phase conjugate beam is utilized to record information in the holographic recording medium at high density without utilizing a mirror for obtaining the phase conjugate beam and its driving part.

Other objects, features and advantages of the present invention will be apparent from the following description of embodiments of the present invention taken in connection with the accompanying drawings.

BEST MODE FOR CARRYING OUT THE INVENTION

Embodiments of the present invention are now described with reference to the accompanying drawings. FIG. 1 is a block diagram schematically illustrating a recording/reproducing device of an optical information recording medium utilizing holography to record and/or reproduce digital information.

The optical information recording/reproducing device 10 includes a pickup 11, a phase-conjugation optical system 12, a disc cure optical system 13, a disc rotation angle detecting optical system 14 and a rotation motor 50. An optical information recording medium 1 can be rotated by the rotation motor 50.

The pickup 11 fulfills the function of emitting reference beam and signal beam to the optical information recording medium 1 and utilizing holography to record digital information in the recording medium. At this time, information signal to be recorded is supplied to a spatial light modulator in the pickup 11 through a signal producing circuit 86 by a controller 89 and the signal beam is modulated by the spatial light modulator.

When information recorded in the optical information recording medium 1 is reproduced, phase conjugate beam 12 of reference beam emitted from the pickup 11 is produced by a reflection layer in the optical information recording medium. The phase conjugate beam is light waves traveling in the opposite direction while holding the same wavefront as input light. Light reproduced by the phase conjugate beam is detected by an optical detector described later in the pickup 11 and signal is reproduced by a signal processing circuit 85. When signal beam passes through lens, wavefront aberration occurs and the focused state of signal beam on disc 1 is deteriorated, although the quality of the reproduced signal can be enhanced by using the phase conjugate beam as the recovered beam.

The exposure time of the reference beam and the signal beam with which the optical information recording medium 1 is irradiated can be adjusted by controlling the opening and closing time of a shutter in the pickup 11 by the controller 89 through a shutter control circuit 87.

The disc cure optical system 13 fulfills the function of producing light beam used for pre-cure and post-cure of the optical information recording medium 1. The pre-cure is a pre-process that when information is recorded in a desired position in the optical information recording medium 1, the desired position is irradiated with predetermined light beam before the desired position is irradiated with the reference beam and the signal beam. The post-cure is a post-process that after information is recorded in the desired position in the optical information recording medium 1, the desired position is irradiated with the predetermined light beam in order to make it impossible to additionally record information in the desired position.

The disc rotation angle detecting optical system 14 is used to detect a rotation angle of the optical information recording medium 1. When the optical information recording medium 1 is adjusted to a predetermined rotation angle, a signal corresponding to the rotation angle is detected by the disc rotation angle detecting optical system 14 and the detected signal can be used to control the rotation angle of the optical information recording medium 1 by the controller 89 through a disc rotating motor control circuit 88.

A light source driving circuit 82 supplies predetermined light source driving current to light sources in the pickup 11, the disc cure optical system 13 and the disc rotation angle detecting optical system 14 and each light source can emit light beam with predetermined light amount.

The pickup 11 and the disc cure optical system 13 are equipped with the mechanism that can slide the position thereof in the radial direction of the optical information recording medium 1, so that the position thereof can be controlled through an access control circuit 81.

The recording technique using holography can record information with super-high density but tends to extremely reduce the tolerance to inclination and positional deviation or shift of the optical information recording medium 1, for example.

Accordingly, a mechanism for detecting an amount of shift of the shift factor having small tolerance such as inclination and positional shift of the optical information recording medium 1, for example, may be provided in the pickup 11 and a servo mechanism for producing a servo controlling signal by a servo signal producing circuit 83 and correcting the shift amount by a servo control circuit 84 may be provided in the optical information recording/reproducing device 10.

Some or all of the optical systems including the pickup 11, the disc cure optical system 13 and the disc rotation angle detecting optical system 14 may be combined into one to be simplified.

FIG. 2 illustrates an example of the optical structure of the pickup 11 in the optical information recording/reproducing device 10. Light beam emitted from light source 301 passes through collimator lens 302 and impinges on shutter 303. When the shutter 303 is opened, the light beam passes through the shutter 303 and then enters optical element 304 constructed by half-wave plate, for example, in which the polarization direction thereof is controlled so that a ratio of light amount of P polarization and S polarization is set to desired ratio. Then, the light beam having the controlled polarization direction enters polarization beam splitter (PBS) prism 305.

The light beam passed through the PBS prism 305 enters beam expander 309, by which the diameter of the light beam is expanded and then passes through phase mask 311, relay lens 310 and PBS prism 307 to enter spatial light modulator 308.

The signal beam having information added by the spatial light modulator 308 passes through the PBS prism 307 and is propagated through relay lens 312 and spatial filter 313. Then, the signal beam is focused on the optical information recording medium 1 by objective lens 325.

On the other hand, the light beam reflected by the PBS prism 305 acts as reference beam and is set to predetermined polarization direction in accordance with recording time or reproduction time by polarization direction conversion element 324. Then, the light beam enters or impinges on galvano-mirror 316 through mirrors 314 and 315. The angle of the galvano-mirror 316 can be adjusted by actuator 317 and accordingly the incident angle of the reference beam incident on the information recording medium 1 after the beam passes through lenses 319 and 320 can be set to desired angle.

As described above, the signal beam and the reference beam impinge on or enter the optical information recording medium 1 so that both of the beams are superimposed on each other in the optical information recording medium 1, so that the interference pattern is formed in the recording medium and the pattern is written in the recording medium to thereby record information. Furthermore, since the incident angle of the reference beam incident on the optical information recording medium 1 can be changed by the galvano-mirror 316, angle-multiplexed recording can be attained.

When the recorded information is reproduced, the reference beam enters the optical information recording medium 1 as described above and the light beam entering the optical information recording medium 1 is reflected by the reflection layer in the medium, so that the phase conjugate beam thereof is produced.

The light beam reproduced by the phase conjugate beam is propagated through the objective lens 325, the relay lens 312 and the spatial filter 313. Then, the recovered (reproduced) beam is reflected by the PBS prism 307 to impinge on the optical detector 318, so that the recorded signal can be reproduced.

FIGS. 3A to 3C are flow charts showing recording and reproducing operation flow of the optical information recording/reproducing device 10. FIG. 3A shows operation flow until preparation of recording or reproduction is completed after the optical information recording medium 1 is inserted into the optical information recording/reproducing device 10. FIG. 3B shows operation flow from the preparation completed state until information is recorded in the optical information recording medium 1. FIG. 3C shows operation flow from the preparation completed state until recorded information in the optical information recording medium 1 is reproduced.

As shown in FIG. 3A, when the medium is inserted, the optical information recording/reproducing device 10 performs judgment of disc as to whether the inserted medium is a medium in which digital information is recorded or reproduced using holography, for example.

As a result of the disc judgment, when it is judged that the inserted medium is the optical information recording medium in which digital information is recorded or reproduced using holography, the optical information recording/reproducing device 10 reads out control data recorded in the optical information recording medium to get information concerning the optical information recording medium and information concerning various setting conditions in recording and reproduction, for example.

After reading out of the control data, various adjustments according to the control data and learning processing concerning the pickup 11 are performed and the optical information recording/reproducing device 10 completes preparation of recording or reproduction.

In the operation flow from the preparation completed state until information is recorded, as shown in FIG. 3B, data to be recorded is first received and information corresponding to the data is sent to the spatial light modulator in the pickup 11.

Thereafter, learning processing of every kind is performed in advance as the need arises so that information can be recorded in the optical information recording medium with high quality and seeking operation and address reproduction are repeated so that the pickup 11 and the disc cure optical system 13 are disposed in the predetermined position of the optical information recording medium.

Thereafter, light beam emitted from the disc cure optical system 13 is used to pre-cure predetermined area and the reference beam and the signal beam emitted from the pickup 11 are used to record data.

After the data is recorded, the data is verified as the need arises and light beam emitted from the disc cure optical system 13 is used to perform post-cure.

In the operation flow from the preparation completed state until the recorded information is reproduced, as shown in FIG. 3C, the learning processing of every kind is performed in advance as the need arises so as to be able to reproduce information from the optical information recording medium with high quality. Then, seeking operation and address reproduction are repeated so that the pickup 11 is disposed in predetermined position of the optical information recording medium. Thereafter, reproduction light is emitted from the pickup 11 to read out information recorded in the optical information recording medium.

FIGS. 4A and 4B show layer structure of the optical information recording medium having a reflection layer according to a first embodiment of the present invention. FIG. 4A shows the state where information is recorded in the optical information recording medium and FIG. 4B shows the state where information is reproduced from the optical information recording medium.

The optical information recording medium 1 includes, as viewed from the side of the optical pickup 11, transparent cover layer 400, recording layer 402, light absorption/transmission layer 406, light reflection layer 410 and third transparent protection layer 412. The interference pattern of reference beam 4A and signal beam 4B is recorded in the recording layer 402.

The light absorption/transmission layer 406 has the physical properties changed to absorb the reference beam 4A and the signal beam 4B at the time of recording of information and transmit the reference beam at the time of reproduction of information. For example, when voltage is applied to the optical recording medium 1, the light absorption/transmission layer 406 changes to absorptive state or transparent state. That is, when information is recorded, the light absorption/transmission layer 406 changes to absorptive state, so that the reference beam 4A and the signal beam 4B passed through the recording layer 402 are absorbed and when information is reproduced, the light absorption/transmission layer 406 changes to transparent state, so that the reference beam is transmitted (T. Ando et al.: Technical Digest ISOM (2006), Th—PP-10). The reference beam 4A passed through the light absorption/transmission layer 406 is reflected by the light reflection layer 410 to be phase conjugate beam 4C.

Furthermore, $WO_3$ (tungsten trioxide) of electrochromic material described in A. Hirotsune et al.: Technical Digest ISOM (2006), Mo—B-04 can be used for the light absorption/transmission layer 406.

This material can be applied with voltage to thereby change to absorptive state or transparent state reversibly, so that when information is recorded, it is made to change to absorptive state so that light is absorbed and when information is reproduced, it is made to change to transparent state so that light is transmitted.

As shown in FIG. 1, the optical information recording/reproducing device includes a characteristic change mechanism numeral 100 for changing reflecting characteristic of the optical information recording medium, which may comprise a voltage application circuit arranged to apply a voltage to an electrochromic material of the optical recording medium, based on the method of applying a voltage to electrode layer of storage medium, described in Y. Fujita et. al.: Technical Digest ISOM (2006), Mo—C-03.

In order to reflect the reference beam 4A by the reflection layer 410 to produce the phase conjugate beam 4C in the direction of irradiating the information recording medium with the reference beam 4A, the reflection layer 410 includes reflecting diffraction grating of the blazed form (saw-toothed form) as shown in FIG. 5.

When the m-order diffracted beam of the reference beam 4A produced by the reflecting diffraction grating is the phase conjugate beam 4C, the reference beam may be incident on inclined plane of the grating vertically and the following expressions (1) and (2) may be satisfied.

$$\alpha = \theta \quad (1)$$

where

α: angle of reference beam and phase conjugate beam to the normal line of the grating θ: angle of inclined plane of the grating $$P = (m\lambda)/(2n \times \sin \alpha) \quad (2)$$

where

P: pitch of the grating

λ: wavelength of reference beam n: refractive index of medium surrounding the reflecting diffraction grating For example, when the blazed grating is designed so that the reference beam having an incident angle of 30 degrees is diffracted so that first-order (m=1) diffracted beam travels in the opposite direction to the incident light beam, the pitch (P) of the grating may be P=0.405/2×1.5 sin 30°=0.27 μm in case where λ=0.405 μm, α=30°, the angle of inclined plane of the grating θ=α=30° and n=1.5.

In the embodiment of the optical information recording medium described above, since the blazed grating in the reflection layer 410 is the reflecting diffraction grating, it is necessary to deposit metal film of aluminum or the like on the surface of the blazed grating shown in FIGS. 6A and 6B, for example.

In the embodiment using EC material, the present invention is not limited to the above structure, but light absorption/reflection layer 406B realized by EC material as shown in FIGS. 6C and 6D, for example, may be used. This material is applied with voltage to thereby change to colored state or transparent state reversibly, so that when information is recorded, it is made to change to transparent state so that light is absorbed and when information is reproduced, it is made to change to colored state so that light is reflected. The light absorption/reflection layer 406B is deposited on the surface of the blazed grating, so that it can function as the reflecting diffraction grating at the time of reproduction of information without depositing metal film as described above.

FIGS. 7A and 7B illustrate the layer structure of an optical recording medium according to another embodiment of the present invention. In the embodiment, an interface 420 of the blazed form shown in FIG. 5 is formed between transparent protection layers 404 and 408. In such structure, signal beam 4B and reference beam 4A are both transmitted through the interface at the time of recording of information and the interface 420 acts as reflecting diffraction grating at the time of reproduction of information.

As a realization method thereof, the refractive index of the transparent protection layer 404 is set to n0 and that of the transparent protection layer 408 is set to n1, for example. The physical properties of the transparent protection layer 408 are changed so as to be set to n1=n0 at the time of recording of information in the recording medium and set to n1>n0 at the time of reproduction of information from the recording medium.

Moreover, the interface 420 may be formed by a single or plural layers made of phase changing material and the physical properties of the layer or layers made of phase changing material may be changed at the time of recording and reproduction of information.

The method of changing the physical properties can be realized by adding thermal energy to the layer and changing the layer between the crystallization state and the amorphous state reversibly in accordance with cooling condition after thermally melted like the recording material of the conventional optical disc such as, for example, DVD-RW. As the phase changing material, GeInSbTe system material for DVD-RW described in PIONEER R&D Vol. 12, No. 2, for example, can be used.

As the mechanism for adding thermal energy to the transparent protection layer 408 (characteristic change mechanism of FIG. 1), the disc cure optical system 13 (FIG. 1), may be utilized to add thermal energy to the transparent protection layer 408. Moreover, the physical properties of the transparent protection layer 404 may be changed to thereby change the refractive index n0.

The embodiment shown in FIGS. 7A and 7B is different from the embodiment shown in FIGS. 4A and 4B in that operation realized by the light absorption/transmission layer 406 and the reflection layer 410 in FIGS. 4A and 4B can be realized by the interface 420, so that the layer structure can be simplified.

FIGS. 8A and 8B are side views illustrating an optical information recording medium according to a third embodiment of the present invention. This embodiment is different from the embodiments of FIGS. 4A, 4B and 6A, 6B in that a light absorption type polarizing filter 430 is utilized instead of the light absorption/transmission layer 406. The light absorption type polarizing filter 430 absorbs light in a certain direction and transmits light in the direction perpendicular thereto. The polarizing filter is made of polyvinyl alcohol (PVA), for example.

When information is recorded in the optical recording medium, the polarizing filter 430 polarizes the polarization direction of the reference beam 4A and the signal beam 4B so that the polarizing filter 430 absorbs the reference beam 4A and the signal beam 4B and when information is reproduced from the optical recording medium, the polarizing filter 430 polarizes the polarization direction of the reference beam 4A so that the polarizing filter 430 transmits the reference beam 4A.

The polarization direction of the reference beam is changed by wave plate or liquid crystal element in the pickup 11.

When the recording medium is of disc-shape like an optical disc, axis for absorption or transmission of the polarizing filter is rotated in each rotational position of disc and accordingly it is necessary to control the polarization direction of the reference signal and the signal beam in accordance with the disc rotational angle. Concretely, rotation of wave plate may be controlled in interlocked relationship with disc or application voltage of liquid crystal element may be controlled in interlocked relationship with rotation of disc.

As described above, according to the optical information recording medium of the present invention, since the optical information recording medium includes the reflection layer for producing the phase conjugate beam of the reference beam at the time of reproduction of information and the signal beam and the reference beam are not reflected by the reflection layer at the time of recording of information while the reference beam is reflected by the reflection layer to produce the phase conjugate beam at the time of reproduction of information, information can be reproduced by the phase conjugate beam without requiring a mirror for producing the phase conjugate beam and its driving part and recording and reproduction of information can be realized without reducing the recording density.

Moreover, the reflection layer is structured to be the reflecting diffraction grating of blazed form as shown in FIG. 5, so that the phase conjugate beam traveling in the opposite direction to the reference beam can be produced and the recording density of the optical information recording medium can be increased.

In the foregoing description, the recording medium is of disc type, although the recording medium may be of card type or any shape.

The foregoing has described the embodiments, although the present invention is not limited thereto and it is apparent for those skilled in the art that various modifications and corrections can be made within the spirit and the scope of claims of the invention.

BRIEF DESCRIPTION OF THE DRAWINGS

FIG. 3A is a block diagram showing an embodiment of operation flow of the optical information recording/reproducing device;

FIG. 3B is a block diagram showing an embodiment of operation flow of the optical information recording/reproducing device;

FIG. 3C is a block diagram showing an embodiment of operation flow of the optical information recording/reproducing device;

Figure 1:
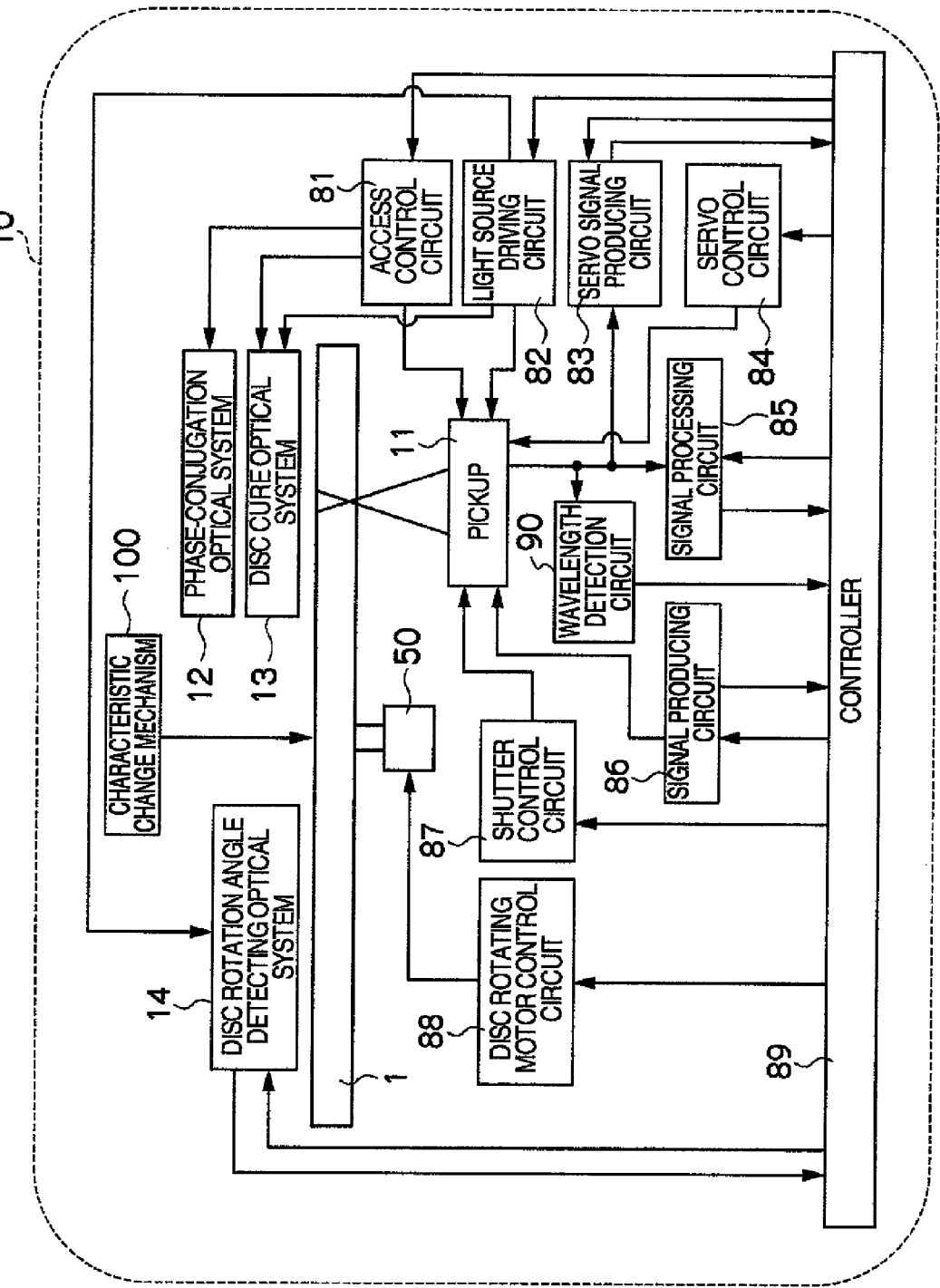
FIG. 1 is a block diagram of an optical information recording/reproducing device according to an embodiment of the present invention.
Figure 2:
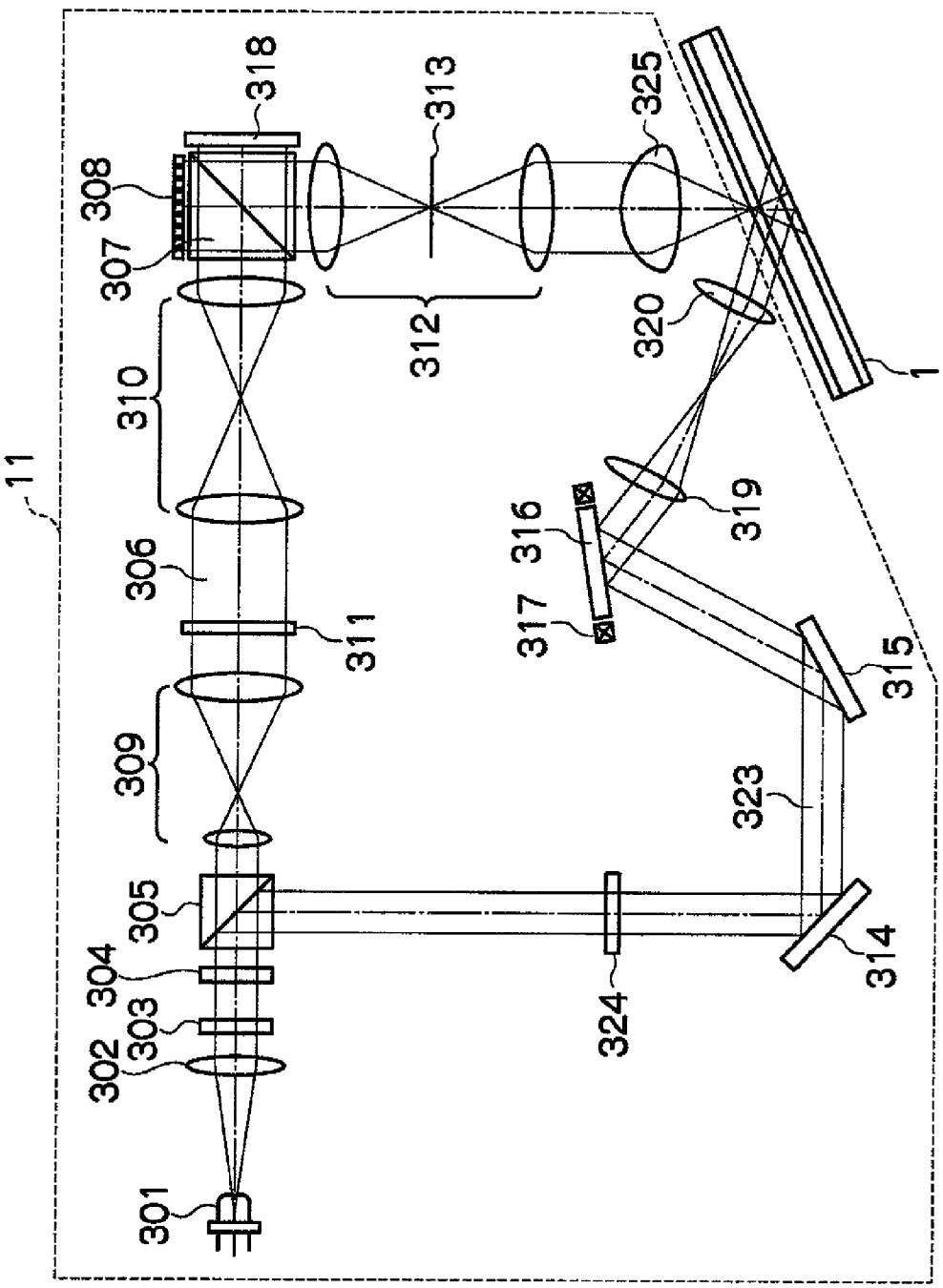
FIG. 2 is a diagram illustrating an embodiment of a pickup in the optical information recording/reproducing device.
Figure 4A:
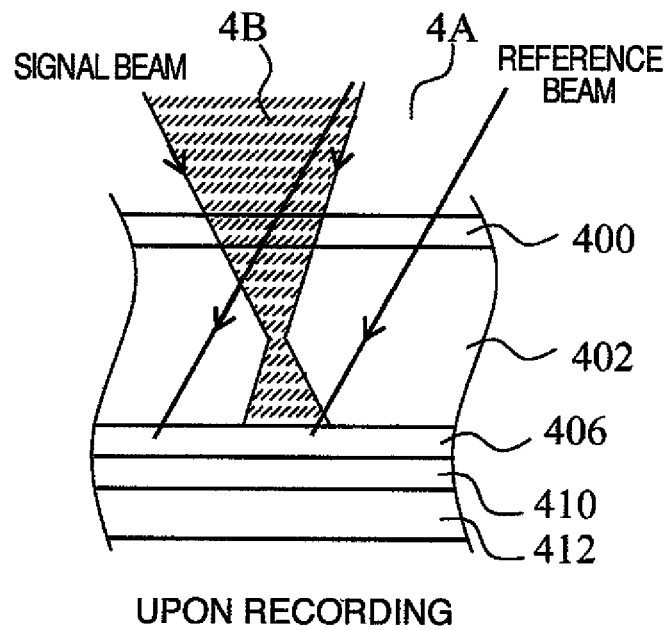
FIG. 4A is a diagram showing layer structure according to a first embodiment of the optical information recording medium.
Figure 4B:
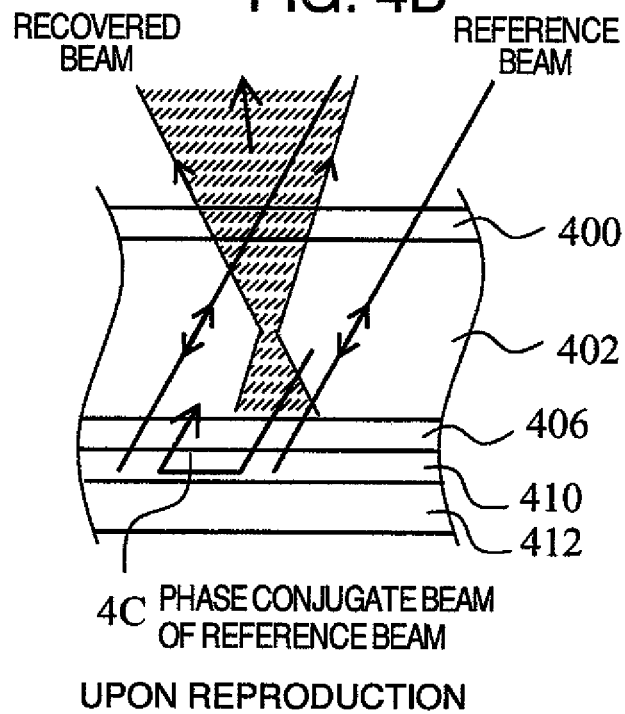
FIG. 4B is a diagram showing layer structure according to the first embodiment of the optical information recording medium.
Figure 5:
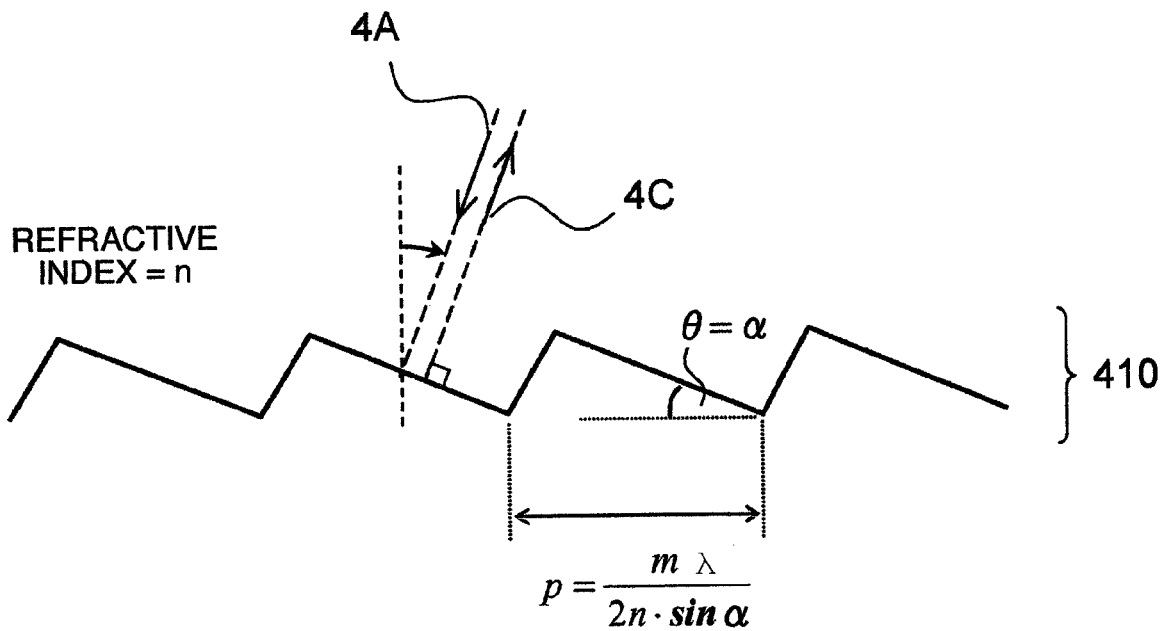
FIG. 5 is a diagram showing the shape of an interface of light reflection layer of the optical information recording medium of FIGS. 4A and 4B on an enlarged scale.
Figure 6A:
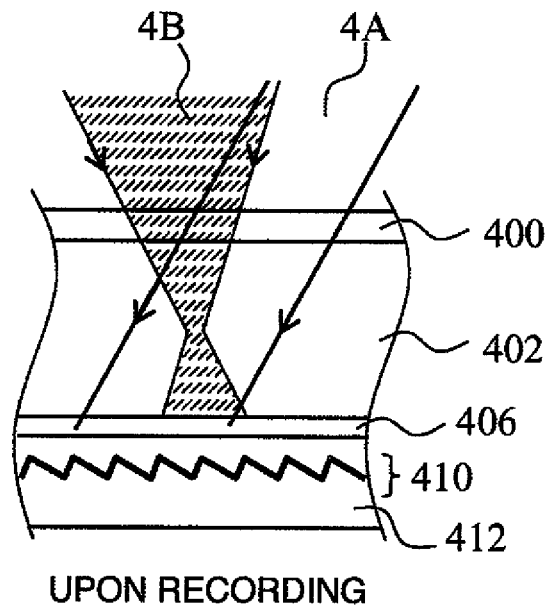
FIG. 6A is a diagram showing the relation between light absorption/transmission layer and reflection layer of the optical information recording medium of FIGS. 4A and 4B.
Figure 6B:
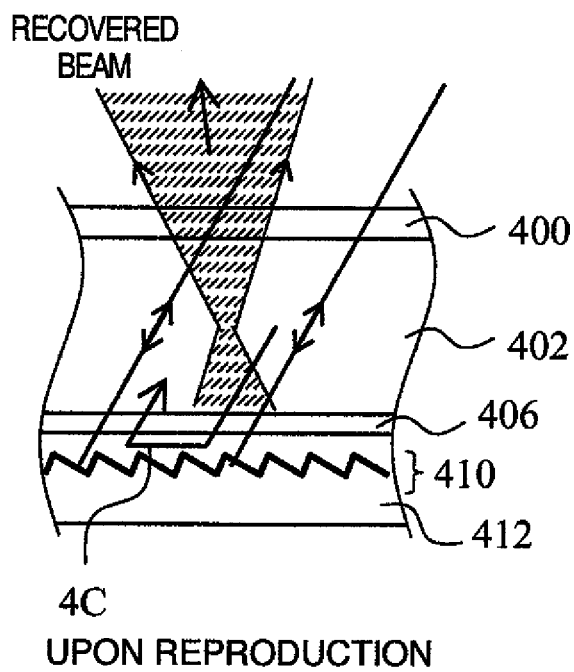
FIG. 6B is a diagram showing the relation between light absorption/transmission layer and reflection layer of the optical information recording medium of FIGS. 4A and 4B.
Figure 6C:
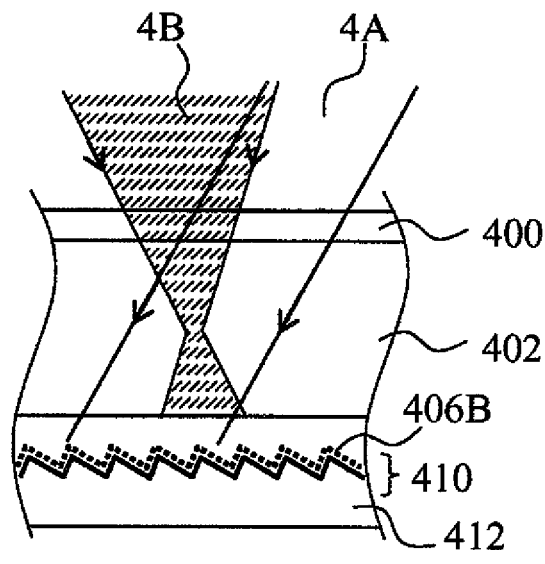
FIG. 6C is a diagram showing the relation between light absorption/transmission layer and reflection layer of the optical information recording medium of FIGS. 4A and 4B.
Figure 6D:
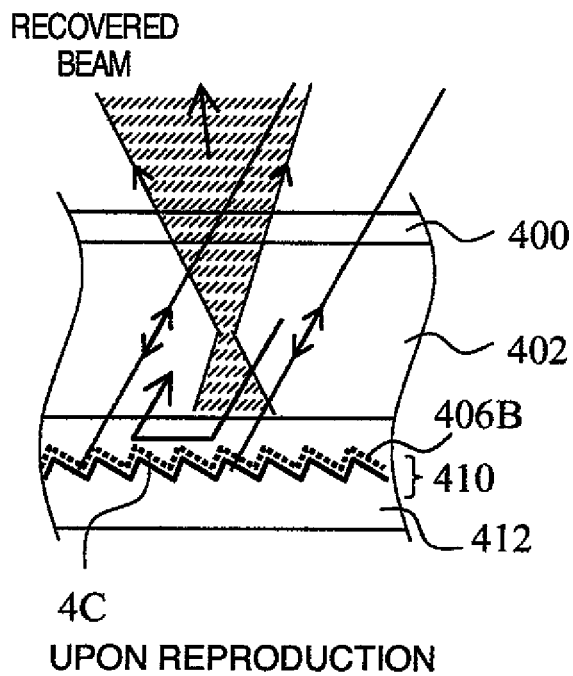
FIG. 6D is a diagram showing the relation between light absorption/transmission layer and reflection layer of the optical information recording medium of FIGS. 4A and 4B.
Figure 7A:
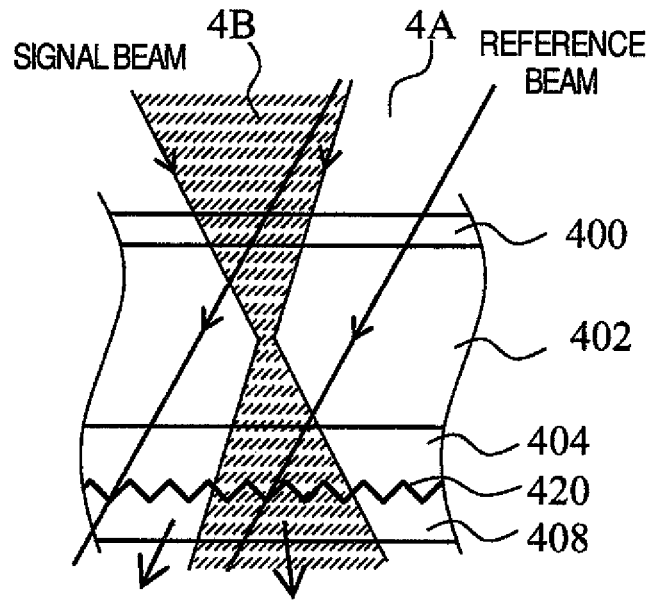
FIG. 7A is a diagram showing layer structure according to a second embodiment of the optical information recording medium.
Figure 7B:
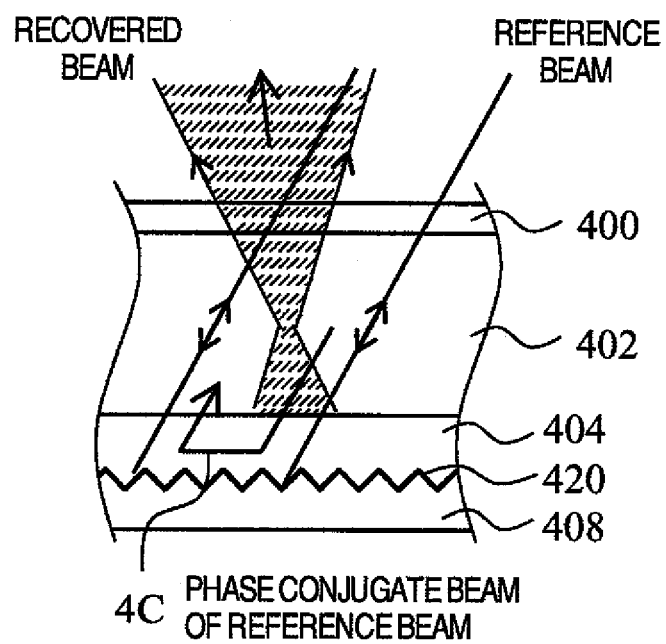
FIG. 7B is a diagram showing layer structure according to the second embodiment of the optical information recording medium.
Figure 8A:
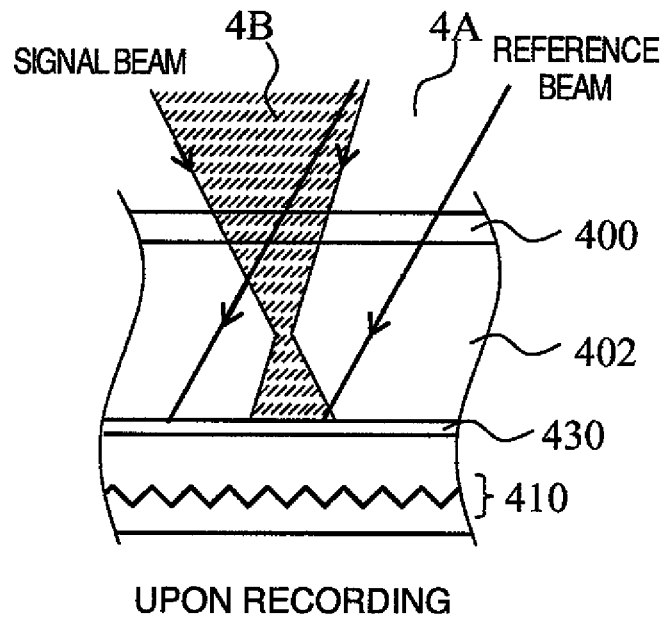
FIG. 8A is a diagram showing layer structure according to a third embodiment of the optical information recording medium.
Figure 8B:
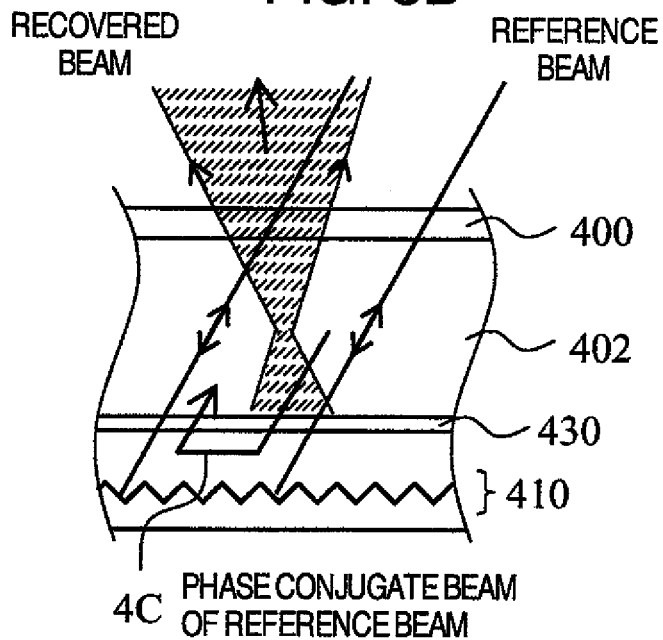
FIG. 8B is a diagram showing layer structure according to the third embodiment of the optical information recording medium.

The invention claimed is:

1. An optical information recording medium configured to use holography to record and reproduce information, the optical information recording medium comprising:
   a recording layer configured to store an interference pattern produced when a signal beam and a reference beam are superimposed, the interference pattern recorded as a change of a refractive index at the time of recording of information; and
   a reflection layer including a reflecting diffraction grating, and configured to produce a phase conjugate beam of the reference beam at the time of reproduction of the information, the phase conjugate beam of the reference beam traveling in the opposite direction to the reference beam while holding the same wavefront as the reference beam;
   wherein the phase conjugate beam of the reference beam is diffracted by the interference pattern to produce reproduction light, which is a first ($1^{st}$) order diffraction beam diffracted by the grating, the reproduction light being supplied to a signal processing system at the time of reproduction of the recorded information; and wherein a reflectance of the optical information recording medium is higher at the time of reproduction of the information as compared with at the time of recording of the information.

2. An optical information recording medium according to claim 1, wherein a reflectance of the reflection layer in the optical information recording layer is higher at the time of reproduction of the information as compared with at the time of recording of the information.

3. An optical information recording medium according to claim 1, further comprising:
a light absorption/transmission layer configured to be reversibly changed to be: in a first state at the time of recording of the information, wherein the signal beam and the reference beam passed through the recording layer are absorbed, or in a second state at the time of reproduction of the information, wherein the reference beam is transmitted;
wherein the reference beam transmitted through the light absorption/transmission layer is reflected by the reflection layer to produce the phase conjugate beam.

4. An optical information recording medium according to claim 3, wherein the light absorption/transmission layer and the light absorption/reflection layer include an electrochromic material configured to change to an absorptive state or a transparent state, in response to an application of voltage.

5. An optical information recording medium according to claim 1, further comprising:
a light absorption/reflection layer configured to be reversibly changed to be: in a first state at the time of recording of the information, wherein the signal beam and the reference beam passed through the recording layer are absorbed or in a second state at the time of reproduction of the information, wherein the reference beam is reflected;
wherein the reference beam is reflected by the light absorption/reflection layer to produce the phase conjugate beam.

6. An optical information recording medium according to claim 5, wherein the light absorption/transmission layer and the light absorption/reflection layer include an electrochromic material configured to change to an absorptive state or a transparent state, in response to an application of voltage.

7. An optical information recording medium according to claim 1, further comprising:
a first transparent layer; and
a second transparent layer;
wherein at the time of recording of the information, the signal beam and the reference beam passed through the recording layer pass through the first and second transparent layers; and
wherein at the time of reproduction of the information, an interface between the first and second transparent layers acts as the reflection layer to produce phase conjugate beam of the reference beam.

8. An optical information recording medium according to claim 7, wherein the interface includes a phase changing material configured to change to a crystallization state or an amorphous state, in order to change a transmissivity or a reflectance, in accordance with a cooling condition after being melted by thermal energy.

9. An optical information recording medium according to claim 8, wherein the phase changing material includes GeInSbTe system material.

10. An optical information recording medium according to claim 1, further comprising:
a first transparent layer having a first refractive index; and
a second transparent layer having a second refractive index;
wherein at the time of recording of the information, the first and second refractive indexes are substantially equal to each other, and the signal beam and the reference beam passed through the recording layer pass through an interface formed between the first and second transparent layers, and
wherein at the time of reproduction of the information, the second refractive index is larger than the first refractive index, and the interface reflects the reference beam as reflection layer to produce phase conjugate beam of the reference beam.

11. An optical information recording medium according to claim 10, wherein the second transparent layer includes a phase changing material configured to change to a crystallization state or an amorphous state, in order to change the refractive index in accordance with a cooling condition after being melted by thermal energy.

12. An optical information recording medium according to claim 11, wherein the phase changing material includes GeInSbTe system material.

13. An optical information recording medium according to claim 1, further comprising:
a polarizing filter configured, at the time of recording of the information, to absorb the signal beam and the reference beam having adjusted polarization direction and passed through the recording layer, and at the time of reproduction of the information, to transmit the reference beam having adjusted polarization direction; and
a reflection layer configured to reflect the reference beam, in order to produce the phase conjugate beam at the time of reproduction of the information.

14. An optical information recording medium according to claim 13, wherein the polarizing filter includes a polyvinyl alcohol.

15. An optical information recording medium according to claim 1, wherein the reflecting diffraction grating has a blazed form.

16. An optical information recording medium according to claim 1,
wherein the reflecting diffraction grating reflects the reference beam in an approximately vertical direction, according to the reflecting surface of the reflecting diffraction grating at the time of reproduction of the information.

17. An optical information recording medium according to claim 1, wherein a diffraction efficiency of the first ($1^{st}$) order diffraction beam of the grating is higher than that of a zeroth ($0^{th}$) order beam of the grating.

18. An optical information recording/reproducing device configured to record in an optical information recording medium including a reflection layer, and also a recording layer configured to store an interference pattern produced when a signal beam and a reference beam are superimposed as a change of a refractive index at the time of recording of information, and to diffract a phase conjugate beam obtained by reflecting the reference beam with which the optical information recording medium is irradiated by a reflection layer of the optical information recording medium by the interference pattern to produce reproduction light and reproduce the information from the reproduction light at the time of reproduction of the recorded information, the optical information recording/reproducing device comprising:
a light source;
a reference beam forming mechanism, configured to form the reference beam from light of the light source;

a signal beam forming mechanism, configured to form the signal beam from light of the light source;

a spatial light modulator, configured to spatial-light-modulate the signal beam by the information at the time of recording of the information;

a first irradiating mechanism, configured to irradiate the recording medium with the modulated signal beam together with the reference beam;

a second irradiating mechanism configured to irradiate the recording medium with the reference beam at the time of reproduction of the information;

a signal processing mechanism configured to perform signal processing in which the reproduction light is processed to reproduce the information; and a reflection layer characteristic changing mechanism configured to change a characteristic of the reflection layer;

wherein the reflection layer characteristic changing mechanism changes the characteristic of the reflection layer so that the recording medium never reflects both the signal beam and the reference beam by the reflection layer, at the time of recording of the information absorbs or transmits both the signal beam and the reference beam, and at the time of reproduction of the information reflects the reference beam by the reflection layer to produce the phase conjugate beam, the phase conjugate beam of the reference beam traveling in the opposite direction to the reference beam while holding the same wavefront as the reference beam;

wherein the reflection layer includes a reflecting diffraction grating configured to produce, at the time of reproduction of the information, the phase conjugate beam of the reference beam, which is a first ($1^{st}$) order diffraction beam; and wherein a reflectance of the optical information recording medium is higher at the time of reproduction of the information as compared with at the time of recording of the information.

19. An optical information recording/reproducing device according to claim 18, wherein the reflecting diffraction grating reflects the reference beam in an approximately vertical direction, according to the reflecting surface of the reflecting diffraction grating at the time of reproduction of the information.

20. An optical information recording/reproducing device according to claim 18, wherein a diffraction efficiency of the first ($1^{st}$) order diffraction beam of the grating is higher than that of a zeroth ($0^{th}$) order beam of the grating.

21. An optical information recording/reproducing method of recording, in an optical information recording medium including a recording layer and a reflection layer, the reflection layer including a reflecting diffraction grating, the optical information recording/reproducing method of recording comprising:

producing an interference pattern in the recording layer when a signal beam and a reference beam are superimposed as a change of a refractive index at the time of recording of information;

irradiating the optical information recording medium with a reference beam;

at the time of reproduction of information:

reflecting the reference beam to obtain a phase conjugate beam of the reference beam by using a reflection layer of the optical information recording medium, the phase conjugate beam of the reference beam traveling in the opposite direction to the reference beam while holding the same wavefront as the reference beam;

diffracting the phase conjugate beam by using the interference pattern to produce reproduction light which is a first ($1^{st}$) order diffraction beam;

reproducing the information from the reproduction light, wherein the recording medium never reflects both the signal beam and the reference beam by the reflection layer, at the time of recording of the information absorbs or transmits both the signal beam and the reference beam; and wherein a reflectance of the optical information recording medium is higher at the time of reproduction of the information as compared with at the time of recording of the information.

22. An optical information recording/reproducing method according to claim 21, wherein the reflecting diffraction grating reflects the reference beam in an approximately vertical direction, according to the reflecting surface of the reflecting diffraction grating at the time of reproduction of the information.

23. An optical information recording/reproducing method of recording according to claim 21, wherein a diffraction efficiency of the first ($1^{st}$) order diffraction beam of the grating is higher than that of a zeroth ($0^{th}$) order beam of the grating.

* * * * *